Patented Feb. 8, 1944

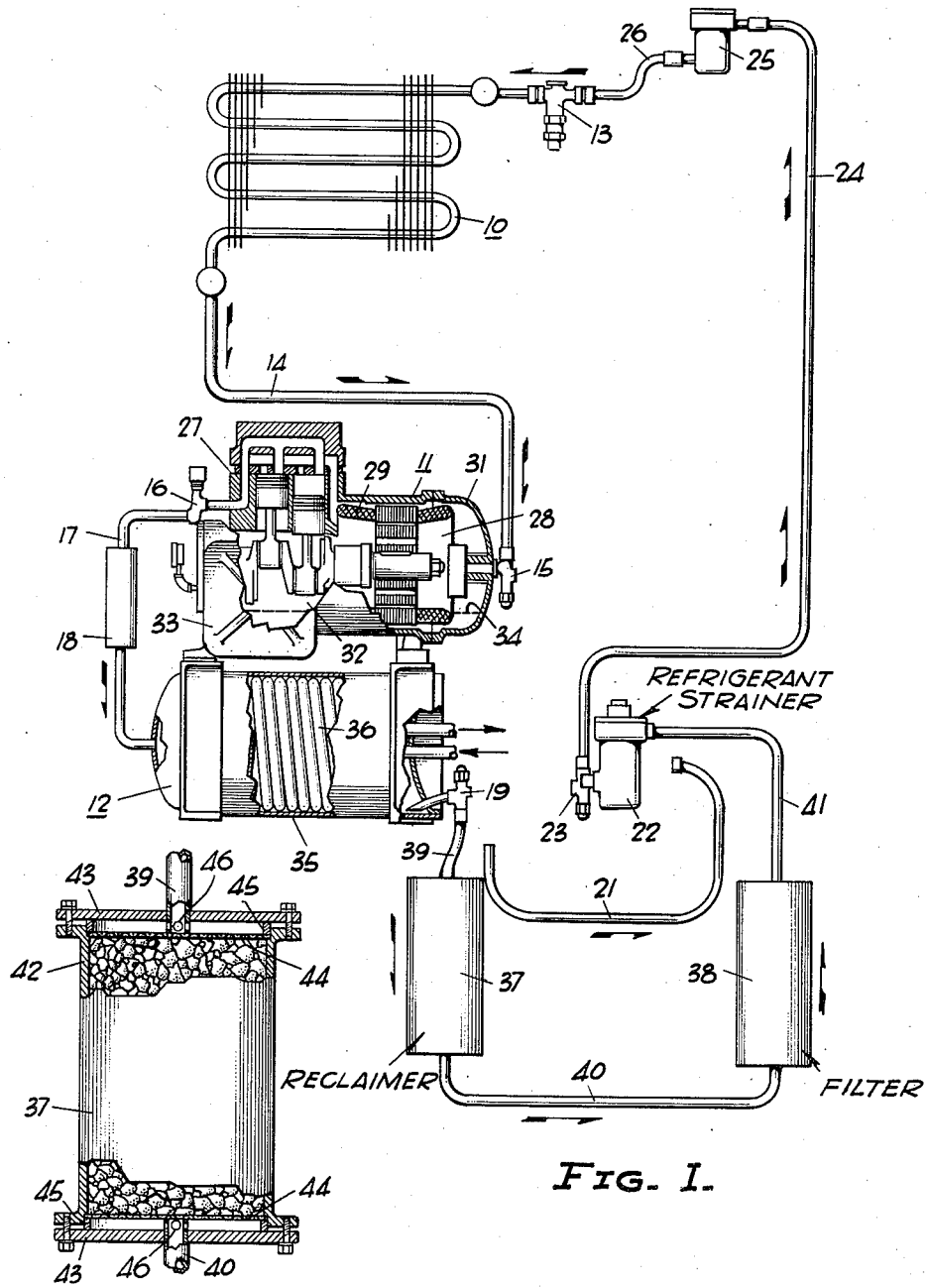

2,341,429

UNITED STATES PATENT OFFICE 2,341,429

METHOD OF RECONDITIONING REFRIGERATING APPARATUS AND RECLAIMING REFRIGERANT

Howard M. Elsey, Oakmont, Pa., assignor to Westinghouse Electric & Manufacturing Company, East Pittsburgh, Pa., a corporation of Pennsylvania Application July 19, 1940, Serial No. 346,278

3 Claims. (Cl. 62—170)

My invention relates to a method of reconditioning the apparatus and reclaiming the refrigerant of a refrigerating system, particularly one comprising an enclosed motor-compressor unit and in which the stator of the motor has been burned out.

When the oil-soaked stator of a motor overheats in an atmosphere of a refrigerant such as dichlorodifluoromethane, a great variety of compounds are formed, which are likely to cause ultimate failure of the refrigerating system. The cellulose insulation breaks down under the heat to yield water, methyl alcohol, acetone, tar and a number of gases such as carbon dioxide, carbon monoxide and methane. The oil reacts with the refrigerant, to form among other substances, hydrochloric acid gas and hydrogen fluoride gas, the acid gases combining with the water from the cellulose to form acid water solutions, which attack the metals of the system and quickly lead to valve failure, due to embrittlement of the hardened steel plate.

According to one method that has been tried, the crankcase and housing of a motor-compressor unit, in which the stator failed, were cleaned mechanically and by washing with kerosene. The stator was replaced, and the refrigerant and oil were replaced with new material. The unit was then run and this "rinsing" charge of refrigerant and oil was replaced with another charge of new material. This method, however, did not reduce the contamination to an amount considered sufficiently low for continued satisfactory operation.

In accordance with my invention, the undesirable compounds are removed in the following manner: The motor-compressor unit is isolated from the remainder of the refrigerating system by closing its suction and discharge shut-off valves. The refrigerant is removed from the unit and the oil drained from the crankcase. The latter is then opened up, cleaned mechanically, and washed out with kerosene or other suitable solvent. If necessary, the stator of the motor is replaced. The refrigerant may be replaced by a fresh charge if it is considered necessary or desirable.

There is installed in the liquid line of the refrigerating system a device which may be termed a reclaimer and which comprises a container having a mixture of absorbent and drying agent therein. Preferably a filter is also provided on the downstream side of the mixture. After the motor-compressor unit is evacuated and the shut-off valves opened, the unit is operated to circulate refrigerant through the system. In such circulation, the refrigerant, while in the liquid state, flows through the reclaimer in contact with the absorbent and the drying agent. The absorbent, which may be fuller's earth, cocoanut charcoal, activated alumina, or silica gel, adsorbs and removes from circulation such compounds as the tars, carbon dioxide, carbon monoxide, acetone, and other deleterious substances. I prefer to use cocoanut charcoal for the absorbent. The drying agent, which may be calcium oxide, activated alumina, or other suitable agent, removes water and the acids, such as hydrogen chloride and hydrogen fluoride. I prefer to use calcium oxide for the drying agent. After a predetermined period of operation, such as 48 hours, the reclaimer and the filter are removed from the refrigerating system.

As a further feature of my invention, the calcium oxide and the cocoanut charcoal are provided in relatively small particles or granules and are thoroughly mixed with each other. The reaction of the acids and the water on the calcium oxide forms a powderous substance which tends to cake the calcium oxide. This tendency to cake is greatly reduced by mixing the charcoal therewith, since there is then less calcium oxide in a given space.

The above-recited and other objects are effected by my invention as will be apparent from the following description and claims taken in connection with the accompanying drawing forming a part of this application, in which:

Fig. 1 is a diagrammatic view of a refrigerating system having a reclaimer assembly connected therein; and, Fig. 2 is a vertical sectional view of the reclaimer.

Referring to the drawing in detail, the refrigerating system comprises an evaporator 10, a motor-compressor unit 11, a condenser 12, which also serves as a liquid receiver, and an expansion valve 13. In addition, the refrigerating system includes a suction conduit 14, suction and discharge valves 15 and 16 whereby the motor-compressor unit may be isolated from the remainder of the refrigerating system, a discharge conduit 17 which may be provided with a muffler 18, a shut-off valve 19, and a liquid line comprising a conduit 21 which is shown in Fig. 1 as replaced by the reclaimer assembly, a refrigerant strainer 22, a shut-off valve 23, a conduit 24, a second refrigerant strainer 25, and a conduit 26. The parts are connected to form a complete refrigerant circuit, as will be fully apparent from the drawing and as is well understood in the art.

The evaporator 10 is shown diagrammatically since the invention is not dependent upon any particular form of evaporator, but in actual practice it may be any one of the several commercial forms of evaporator. It may serve any desired cooling purpose, for example, it may cool a stream of air flowing thereover.

The motor-compressor until 11 is of the enclosed type, comprising a compressor 27 and a motor 28 for driving the compressor, the motor including a stator 29. The motor-compressor unit includes a casing 31 which forms a common housing or casing for the compressor and the motor. The motor 28 is, therefore, enclosed in an atmosphere of refrigerant vapor. In the illustrated embodiment, the vaporized refrigerant is conveyed from the suction conduit 14 through the portion of the casing 31 containing the motor, so that the latter is cooled by direct contact of the refrigerant vapor therewith. The casing 31 includes a portion forming a crankcase 32 provided with a removable side plate 33, whereby access may be had to the crankcase. The lower portion of the crankcase 32 constitutes a reservoir for a body of oil for lubricating the motor-compressor unit, the oil, whose level is indicated at 34, extending into the motor containing portion of the casing so that the lowermost portion of the stator 29 is immersed in the oil and at least a portion of the stator is oil-soaked.

The condenser 12 comprises a drum 35 and coils 36 therein through which cooling water is circulated for condensing the compressed refrigerant. The condensed refrigerant collects in the bottom of the drum so that the latter also serves as a liquid receiver. The expansion valve 13 may be of any suitable type known in the art, for example, it may be of the type known as a thermostatic expansion valve, which regulates the flow of refrigerant to the evaporator in response to the opposed effects of the pressure and the temperature of the refrigerant discharged from the evaporator and serves to maintain the superheat thereof substantially constant.

There is connected into the refrigerating system, as shown in Fig. 1, a reclaimer assembly comprising a reclaimer 37, a filter 38 and connecting conduits 39, 40 and 41. The reclaimer 37, shown in greater detail in Fig. 2, includes a container which may comprise a cylindrical shell 42 and covers 43 at the ends thereof. Within the container there is provided a mixture of absorbent and drying agent, both of which are preferably in the form of small particles or granules and thoroughly mixed with each other. This material is held within the container in spaced relation to the covers 43 by means of screens 44, which may be retained in place in any suitable manner, for example, by rings 45 and shoulders in the shell 42, as shown in Fig. 2. The conduits 39 and 40 preferably project through the covers 43 and abut against the central portions of the screens 44, serving to hold the same against the material between the two screens. These conduits are prefably provided with openings 46 to provide communication with the chambers between the covers 43 and the screens 44.

The absorbent provided in the reclaimer 37 may be of any suitable material which will remove such compounds as the tars, carbon dioxide, carbon monoxide, and acetone. It may be, for example, fuller's earth, cocoanut charcoal, activated alumina, or silica gel. I prefer to use cocoanut charcoal. The drying agent in the reclaimer 37 is any suitable material which will remove water and the acids, such as hydrogen chloride and hydrogen fluoride, and may be, for example, calcium oxide or activated alumina. I consider calcium oxide preferable.

Operation

In the normal operation of the refrigerating apparatus, the reclaimer assembly is omitted and replaced by the conduit 21, which is soldered to the shut-off valve 19 and bolted to the strainer 22. The refrigerating apparatus operates in the usual manner of apparatus of this type, the circulation of refrigerant being effected by the compressor 27 driven by the motor 28. The refrigerant vaporized in the evaporator 10 by the heat extracted from the air flowing over the evaporator, flows through the suction conduit 14, the valve 15 and the motor-containing portion of the casing 31 to the compressor 27, which raises the pressure of the refrigerant gas. The compressed refrigerant is conveyed through the discharge valve 16, the discharge conduit 17, and the muffler 18 to the condenser 12, wherein it is condensed and collected in the bottom thereof. The liquid refrigerant then flows through the valve 19, the conduit 21, the strainer 22, the valve 23, the conduit 24, the strainer 25, and the conduit 26 to the expansion valve 13, which regulates the flow of refrigerant to the evaporator and reduces the pressure thereof. From the expansion valve, the refrigerant is admitted to the evaporator 10, again to serve for cooling the air flowing thereover.

Due to any one of several causes, the refrigerant within the system may become contaminated. For example, should the stator 29 be burned out, due to any one of several reasons, a variety of compounds may be formed, as mentioned above.

In accordance with my invention, the refrigerating system is reconditioned and the refrigerant is reclaimed as follows: If the motor 28 is operable, as is the case when the stator 29 has already been replaced, the refrigerating system is pumped down, that is, the refrigerant is pumped into the combined condenser and liquid receiver 12. This is done by operating the motor-compressor unit with the valve 19 closed, so that the low pressure side of the system, including the interior of the motor-compressor unit, is substantially evacuated and the refrigerant is collected, primarily in liquid form, in the condenser and liquid receiver 12. The suction and discharge shut-off valves 15 and 16 are then closed to isolate the motor-compressor unit from the remainder of the system.

If the stator has been burned out and has not been replaced, the unit is isolated by closing the valves 15 and 16 without first pumping down the system. In either case, the oil is drained from the crankcase and the latter is opened by removing the side plate 33, the refrigerant within the unit being vented to the atmosphere. The crankcase is then cleaned of solid and semi-solid impurities by mechanically cleaning the same, as by scraping. The crankcase and the casing are then washed out with kerosene or other suitable solvent. The stator 29 is replaced, if necessary. The side plate 33 is then replaced, and a fresh charge of lubricating oil is admitted to the unit. The reclaimer assembly is connected into the refrigerant circuit between the valve 19 and the strainer 22, as shown in Fig. 1, the conduit 21 being removed during this time. The reclaimer and the filter are disposed vertically, as shown. The refrigerating system, other than the condenser 12, is then evacuated in any suitable manner, as is well understood in the art. This may be done; for example, by operating the compressor 27 and also operating a vacuum pump connected to the discharge side of the compressor. When the evacuation is completed, the vacuum pump is disconnected and the shut-off valves opened. The compressor is then operated to circulate refrigerant through the system for a predetermined period of time, preferably forty-eight hours.

During this operation, refrigerant is circulated through the system, including the reclaimer assembly, in substantially the same way as in normal operation. The condensed refrigerant flows through the reclaimer 37 and the filter 38. In the reclaimer 37, the liquid refrigerant flows through the openings 45 and the screen 44 and then through the body of the cocoanut charcoal and calcium oxide. The cocoanut charcoal adsorbs and removes from the liquid refrigerant such compounds as the tars, carbon dioxide, carbon monoxide, acetone, and other deleterious substances. The drying agent removes water and acids, such as hydrogen chloride and hydrogen fluoride. The action of the calcium oxide on the water and acids creates a powderous substance which is, to some extent, carried along with the liquid refrigerant and is removed from the liquid refrigerant by the filter 38 as the liquid refrigerant flows therethrough. The powderous substance also tends to cake the calcium oxide, which tendency is greatly overcome by mixing the charcoal therewith to "dilute" the calcium oxide; that is, to reduce the amount per cubic inch.

During this period of 48 hours' operation, the refrigerant is preferably circulated through the entire refrigerant circuit, as in the illustrated embodiment. Where there are several motor-compressor units and it is not feasible to operate all of them at the same time, then the same procedure should be carried out for each motor-compressor unit. Also, when applying the present method to a refrigerating system having a liquid receiver or other refrigerant-containing portion normally cut out of active circulation, as in the case of the known type of refrigerating system which includes an evaporative condenser and which is critically charged to provide liquid sub-cooling in a portion of the condenser, the following modification in the method is preferably made: The refrigerating system is operated for a period of 40 hours with the normally inactive portion cut out of circulation. The valves are then opened to permit circulation through the normally inactive portion and to remove impurities therefrom, for a period of four hours, after which such portion is again isolated from the remainder of the system. The system is then operated for the remaining four hours with the normally inactive portion isolated.

After the refrigerant has been circulated through the system for the required time, the oil is drained from the crankcase. If the oil shows any indication of contamination (dirty brown color, odor, or otherwise contaminated), the casing 31, particularly the crankcase, is again washed out with kerosene or other suitable solvent, the system being again pumped down and the unit isolated by closing the valves 15 and 16. After the casing is again washed out and the side plate 33 replaced, it is evacuated with a vacuum pump and a new charge of oil is admitted to the crankcase, the vacuum being preferably used to draw in the oil. The crankcase is preferably purged with refrigerant. All of the shut-off valves are then opened, and the compressor is operated for an additional two hours.

The system is again pumped down in the usual manner and the reclaimer assembly is removed. The conduit 21 is replaced, being soldered to the valve and bolted to the strainer 22. The refrigerant circuit is then tested for leaks and, if necessary, the conduits are evacuated with a vacuum pump.

The system is then restored to normal operation by opening all valves and operating the same for a short period of time to make certain that it is in proper operating condition.

While I have shown my invention in but one form, it will be obvious to those skilled in the art that it is not so limited, but is susceptible of various changes and modifications without departing from the spirit thereof, and I desire, therefore, that only such limitations shall be placed thereupon as are specifically set forth in the appended claims.

What I claim is:

1. The method of reconditioning a refrigerating system comprising an enclosed motor-compressor unit having a crankcase, the stator of which has burned out in the presence of a hydrocarbon lubricant and a refrigerant containing fluorine and chlorine, which method comprises cleaning the crankcase mechanically and by washing, removing the burned-out stator and replacing it with another stator, and then operating the compressor to circulate refrigerant through the refrigerating system and in such circulation conveying the refrigerant in contact with an absorbent material adapted to remove deleterious carbon compounds by adsorption and in contact with a basic compound adapted to remove acids.

2. The method of reconditioning a refrigerating system comprising a motor-compressor unit having a fluid tight casing, the stator of which has burned out in the presence of a hydrocarbon lubricant and a refrigerant, which method comprises cleaning the interior of the casing, removing the burned-out stator and replacing it with another stator, and then operating the compressor to circulate refrigerant through the refrigerating system and in such circulation conveying the refrigerant in contact with a material adapted to remove deleterious carbon compounds by adsorption and in contact with a substance which chemically reacts with acids.

3. The method of reconditioning a refrigerating system comprising a motor-compressor unit having a fluid tight casing, the stator of which has burned out in the presence of a hydrocarbon lubricant and a refrigerant, which method comprises cleaning the interior of the casing, removing the burned-out stator and replacing it with another stator, and then operating the compressor to circulate refrigerant through the refrigerating system and in such circulation conveying the refrigerant in contact with charcoal and calcium oxide.

HOWARD M. ELSEY.